United States Patent [19]

Powell, Jr.

[11] Patent Number: 4,603,506
[45] Date of Patent: Aug. 5, 1986

[54] HYDROPONIC PLANT GROWING DEVICE

[76] Inventor: George P. Powell, Jr., 205 Brandywine Rd., Charlotte, N.C. 28209

[21] Appl. No.: 668,574

[22] Filed: Nov. 5, 1984

[51] Int. Cl.$^4$ ............................................. A01G 31/00
[52] U.S. Cl. .......................................... 47/62; 47/48.5
[58] Field of Search .................. 47/59, 60, 61, 62, 63, 47/64, 65, 79, 48.5

[56] References Cited

U.S. PATENT DOCUMENTS

| | | | |
|---|---|---|---|
| 3,053,011 | 9/1962 | Silverman | 47/79 |
| 3,159,413 | 12/1964 | Silverman | 47/59 |
| 3,311,270 | 3/1967 | Juergens | 47/48.5 |
| 4,211,034 | 7/1980 | Piesner | 47/59 |
| 4,310,990 | 1/1982 | Payne | 47/59 |

Primary Examiner—Robert A. Hafer
Assistant Examiner—Bradley M. Lewis
Attorney, Agent, or Firm—Bell, Seltzer, Park & Gibson

[57] ABSTRACT

One or more plant growing trays are supported on a tubular support frame constructed of plastic pipe to provide an attractive support for the plant growing trays and to also provide a storage chamber for the proper volume of fluid growing solution. The fluid growing solution is periodically supplied to the plant growing trays by air pressure entering the tubular growing solution storage chamber and then the fluid growing solution drains from the plant growing trays and back into the tubular storage chamber. A timer control device is provided to control the periodic supplying of the air pressure to force the fluid growing solution into the plant growing trays.

9 Claims, 6 Drawing Figures

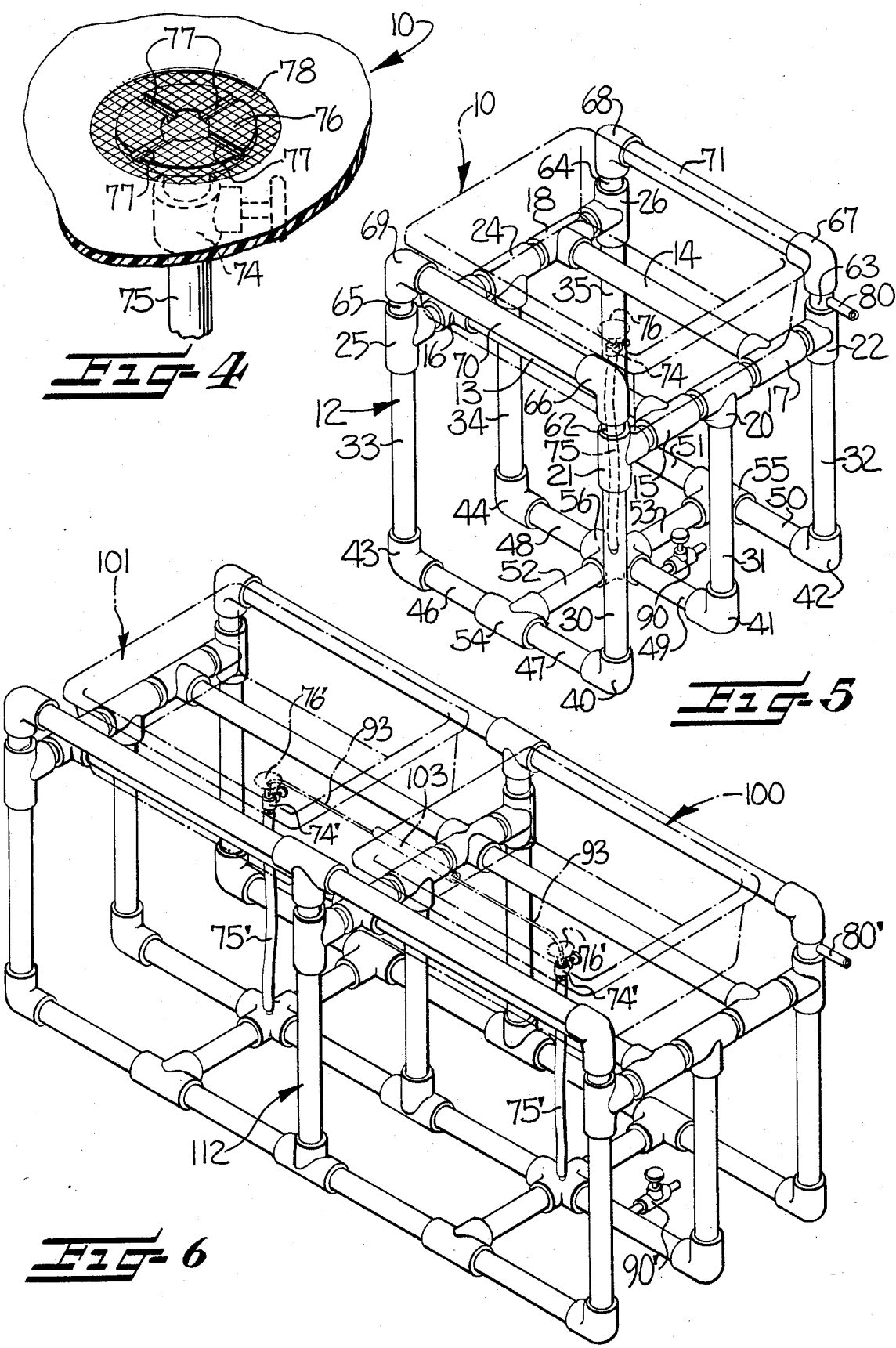

HYDROPONIC PLANT GROWING DEVICE

FIELD OF THE INVENTION

This invention relates generally to a hydroponic plant growing device for use in a limited space, such as a home, apartment, condominium or the like, and more particularly to such a device with a tubular support frame which provides an attractive support base for the plant growing tray and also provides a storage chamber for the proper volume of fluid growing solution to be periodically supplied to and drawn from the plant growing tray.

BACKGROUND OF THE INVENTION

Hydroponic plant growing devices for various types of plants are well known. For example such devices are disclosd in U.S. Pat. Nos. 3,159,413; 4,016,677; 4,118,891; 4,198,783; 4,211,034; and 4,419,842, and U.S. Design Pat. No. 237,898. However, these prior hydroponic growing devices have not been generally adapted for widespread use because of the cost involved in the initial purchase of the equipment, the cost of operating the devices, and the generally unattractive appearance of these devices.

SUMMARY OF THE INVENTION

With the foregoing in mind, it is an object of the present invention to provide a hydroponic plant growing device in which the growing tray is supported by a tubular support frame forming a storage chamber for the proper volume of fluid growing solution to be periodically supplied to and drawn from the plant growing tray a providing an attractive and economical compact unit for use in a limited space.

In accordance with the present invention, the hydroponic plant growing device may utilize a single growing tray or multiple growing trays supported by the tubular support frame. The multiple support trays may be supported by a single support frame or they may be supported by multiple tubular support frames which are interconnected to each other to provide the proper volume of fluid growing solution for the multiple growing trays.

The tubular support frame of the present hydroponic plant growing device includes spaced-apart upper tubular horizontal frame members on which the bottom of the plant growing tray is supported and spaced-apart lower tubular horizontal frame members providing a base for the plant growing device with vertical tubular frame members having their upper and lower ends communicatively connected to the corresponding upper and lower tubular horizontal frame members. The tubular frame members thus collectively define a closed storage chamber containing a sufficient volume of fluid growing solution to fill but not overflow the plant growing tray. A fluid growing solution drain and supply tube is communicatively connected between the bottom of the plant growing tray and the frame members defining the storage chamber and pressurized air supply means is communicatively connected with the fluid growing solution storage chamber.

Control means is associated with the pressurized air supply means and is operable to activate the pressurized air supply and force the fluid growing solution from the fluid growing solution storage chamber and upwardly through the drain and supply tube into the plant growing tray. The control means is also operable to deactivate the pressurized air supply means and permit the fluid growing solution to drain from the growing tray and back through the fluid growing solution drain and supply tube and into the fluid growing solution storage chamber. The control means is preferably in the form of a suitable timer which may be set to vary the cycle of supplying fluid growing solution to the tray and permitting the draining of the fluid growing solution back into the storage chamber.

The tubular support frame is preferably formed of sections of plastic pipe which are joined together at their ends by plastic pipe connector joints. It is also preferred that an adjustable air bleeder valve be interposed in the air supply line so as to vary the rate of the fluid growing solution into and out of the plant growing tray. The fluid growing solution drain and supply tube is preferably connected between the bottom wall of the growing tray and one of the lower tubular horizontal frame members.

DESCRIPTION OF THE DRAWINGS

Other objects and advantages will appear as the description proceeds when taken in connection with the accompanying drawings, in which—

FIG. 4 is an enlarged fragmentary isometric view of the central portion of the plant growing tray and illustrating the drain therefor;

FIG. 5 is an isometric view of the plant growing device with the plant growing tray being shown in phantom lines; and FIG. 6 is an isometric view of a modified form of plant growing device with two plant growing trays.

DESCRIPTION OF THE ILLUSTRATED EMBODIMENT

Figure 1:
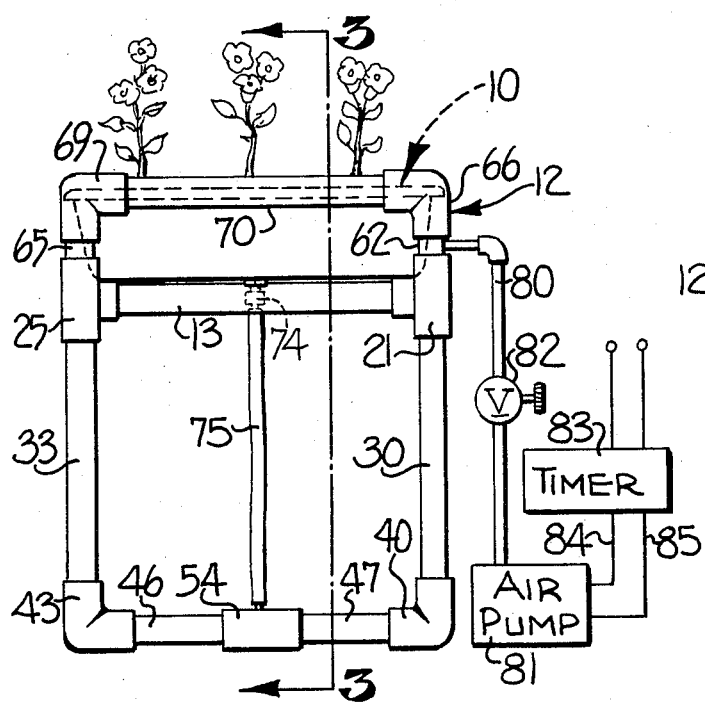
FIG. 1 is a front elevational view of the plant growing device and schematically illustrating the mechanism for periodically supplying pressurized air to force the fluid growing solution into the growing tray.
Figure 2:
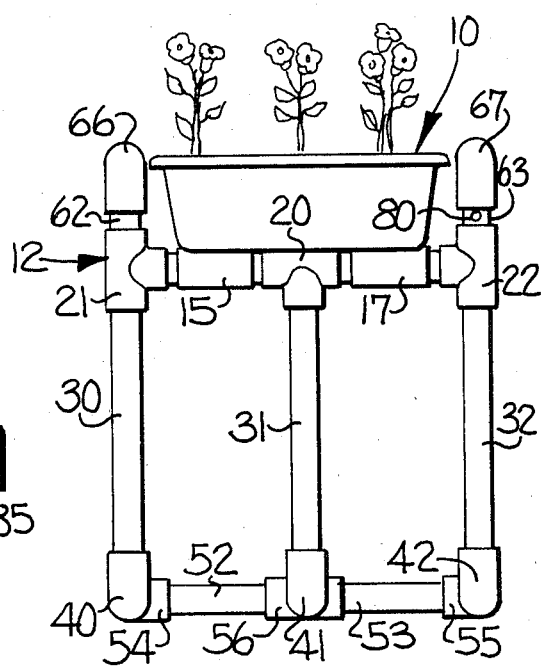
FIG. 2 is an end elevational view of the plant growing device.

The hydroponic plant growing device of the present invention is illustrated in FIGS. 1 through 5 as including a single rectangular plant growing pan or tray indicated broadly at 10 while the embodiment of the hydroponic plant growing device shown in FIG. 6 includes multiple plant growing trays, to be later described. The plant growing tray 10 includes side and end walls, a bottom wall and an open top and contains any suitable type of inert growing medium, shown in FIG. 3 in the form of small, round stones or pebbles 11, in which the root system of the plants is embedded.

A tubular support frame, broadly indicated at 12, is positioned beneath the plant growing tray 10 and provides a support for retaining the plant growing tray in a horizontal position thereon. The tubular support frame includes spaced-apart upper tubular horizontal frame members 13, 14 on which the bottom wall of the plant growing tray 10 is supported. The tubular horizontal frame members 13, 14, as well as the remaining portions of the tubular support frame 12, are preferably formed of sections of plastic pipe with the ends of the plastic pipe sections being communicatively joined together by plastic pipe connector joints.

Opposite ends of the respective upper horizontal frame members 13, 14 are connected to T-joints 15, 16 and 17, 18. The T-joints 15, 17 at one end of the support frame 12 are adjoined by short pipe sections to a central T-joint 20 and end T-joints 21, 22. The T-joints 16, 18 at the opposite end of the support frame 12 are joined by short pipe sections to a central T-joint 24 and to end T-joints 25, 26. The T-joints 15, 17 and 20 at one end of the support frame and the T-joints 16, 18 and 24 at the other end of the support frame, along with the short pipe sections, also form a part of the upper tubular horizontal frame members.

The upper ends of vertical tubular pipe frame members 30, 31 and 32 are connected to the respective T-joints 21, 20 and 22 while vertical tubular pipe frame members 33, 34 and 35 are joined at their upper ends to the respective T-joints 25, 24 and 26. The lower ends of the vertical tubular frame members 30-35 are provided with respective elbow or L-joints 40-45 which are communicatively connected to spaced-apart lower tubular horizontal frame members. The lower tubular horizontal frame members include pipe joints 46-53 with a T-joint 54 connecting the adjacent ends of the pipe joints 46, 47 and 52. A T-joint 55 connects the adjacent ends of the pipe joints 50, 51 and 53, and a four-way pipe joint 56 connects the adjacent ends of the pipe joints 48, 49, 52 and 53.

Figure 3:
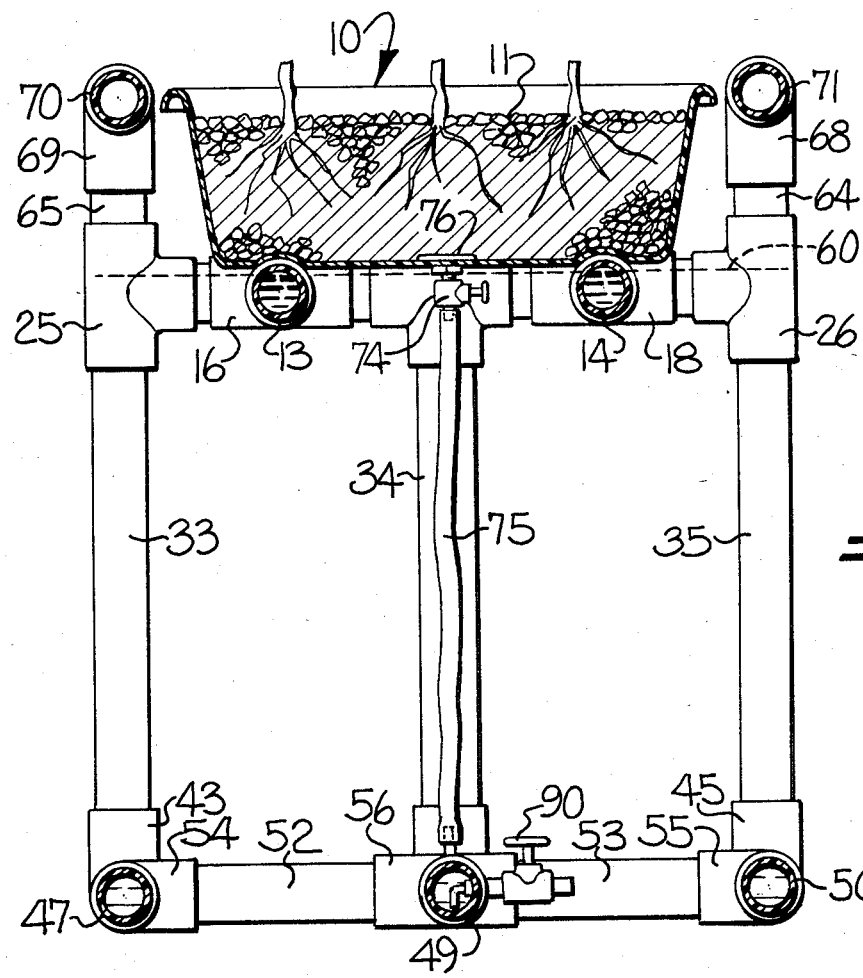
FIG. 3 is an enlarged vertical sectional view taken substantially along the line 3—3 in FIG. 1.

The horizontal and vertical tubular frame members of the support frame 12 collectively define a storage chamber containing a fluid growing solution which fills the storage chamber, up to the level of the upper horizontal frame members 13, 14, as indicated by the dotted line 60 in FIG. 3. The storage chamber contains a sufficient volume of growing solution to fill but not overflow the plant growing tray 10, in a manner to be presently described.

Substantially inverted U-shaped tubular members are positioned adjacent opposite side walls of the plant growing tray 10 and are communicatively connected at opposite ends to the tubular members defining the fluid growing solution chamber to thereby form an air pressure chamber above the level of the fluid growing solution. The substantially inverted U-shaped tubular members are formed by short vertical pipe sections 62-65, corresponding elbow or L-joints 66-69 and horizontal front and rear pipe sections 70, 71.

Fluid growing solution drain and supply tube means is communicatively connected between the bottom wall of the plant growing tray 10 and the frame members defining the closed storage chamber containing the growing solution. The fluid growing solution drain and supply tube means is illustrated in the form of a vertical tube 75 connected at its lower end to the upper portion of the four-way pipe joint 56 and connected at its upper end, by means of a gate valve 74, to a drain connector 76 positioned in the center of the growing tray 10. As illustrated in FIG. 4, the drain connector 76 includes radial grooves 77 and the central opening thereof is covered by a protective screen 78. The radial grooves 77 ensure substantially complete drainage of the growing tray 10 and also aids in dispersing oxygen to the plants in the growing tray 10, in a manner to be presently described.

Pressurized air supply means is communicatively connected with the air pressure chamber above the level of the fluid in the fluid growing solution chamber. The pressurized air supply means includes an air supply line 80 connected at one end to the pipe joint 63 and at its other end to a suitable source of pressurized air, illustrated in the form of a conventional electrically operable air pump 81. An adjustable air bleeder valve 82, or other suitable type of air escape means, is interposed in the supply line 80 and is operable to vary the rate of movement of the fluid growing solution into and out of the plant growing tray 10, in a manner to be presently described.

Control means is operatively associated with the pressurized air supply means and is operable to activate the air supply means and force the fluid growing solution from the fluid growing solution storage chamber and upwardly through the drain and supply tube 75 into the plant growing tray 10. The control means also is operable to deactivate the pressurized air supply means and permit the fluid growing solution to drain from the growing tray 10 and back through the fluid growing solution drain and supply tube 75 and into the fluid growing solution storage chamber. The control means includes a timer device 82 which is suitably connected to a source of electrical energy and which includes electrical wires 84, 85 connected to the air pump 81 for activating the same at the desired intervals. The length of the air supply line 80 can be varied as desired so that the air pump 81 and timer 83 can be located adjacent to or remote from the support frame 12.

As a specific but nonlimiting example, it has been found that a suitable hydroponic plant growing device for use in a limited space, such as a home, apartment, condominium or the like may be provided by using a plastic growing tray 10 which is twenty-five inches long, twenty inches wide and six inches deep. The tubular support frame 12 is constructed of PVC plastic pipe sections of two and one-quarter inch diameter and the tray 10 is supported at a height of approximately thirty inches above the floor. As will be noted, the length and width dimensions of the tubular support frame 12 are substantially the same as the corresponding length and width dimensions of the rectangular plant growing tray 10.

The plants or seeds are positioned in the aggregate 11 in the proper spaced relationship for growing, the gate valve 74 is closed, and three gallons of fluid growing solution is prepared to provide the proper nutrition to the plants for growing. This fluid growing solution is poured into the tray 10 and on the aggregate 11 and substantially fills the same to the level of the aggregate 11. The gate valve 74 is then opened and the air bleeder valve 82 is adjusted to allow the fluid to slowly drain through the drain nozzle 76, the drain and supply tube 75 and into the tubular frame members defining the storage chamber. It is usually desirable to adjust the valve 82 so that approximately five to ten minutes is required for draining the growing solution from the tray 10 into the tubular storage chamber 12, depending upon the requirements of the particular type of plants being grown.

The timer 82 is then set to actuate the air pump 81 approximately two or three times in each twenty-four hour period and may be operated for approximately thirty to forty-five minutes during each pumping operation, again depending upon the adjustment of the bleeder valve 82. As pressurized air is forced into the upper air pressure chamber above the level of the fluid growing solution, the fluid growing solution is forced up the supply and drain tube 75 and into the aggregate 11 in the growing tray 10 to supply the required nutrients to the plants. After the air pump 81 has been operated a sufficient length of time to pump substantially all of the fluid up into the tray 10, the timer 82 deactivates the air pump 81 so that the growing solution can begin to drain back into the storage chamber through the drain and supply tube 75. The growing solution should retain sufficient growing strength and nutrients to last approximately two weeks and then it is drained and replaced with a fresh supply of growing solution. The growing solution is then removed through drain means, illustrated in FIGS. 3 and 5 in the form of a drain valve 90 positioned in the lower portion of the lower pipe section 49 (FIG. 3). The drain valve 90 is provided with a solution pick up tube 91 (FIG. 3) to permit complete drainage of the growing solution. To remove the growing solution, the gate valve 74 is closed and pressurized air is pumped into the closed chamber to force the growing solution out of the drain valve 90.

The embodiment of the hydroponic plant growing device shown in FIG. 6 is constructed in a similar manner to the hydroponic plant growing device shown in FIGS. 1–5 and is formed of plastic pipe sections communicatively joined together by plastic pipe connector joints to provide a tubular support frame, broadly indicated at 112 to provide a storage chamber for the proper volume of fluid growing solution to be periodically supplied to and drawn from a pair of plant growing trays, indicated in phantom lines in FIG. 6 at 100 and 101. As will be noted in FIG. 6, each of the plant growing trays 100, 101 is provided with a fluid growing solution drain and supply tube 75' which communicatively connects the bottom wall of the respective growing trays to the lower frame members defining the storage chamber.

A pressurized air supply pipe 80' is connected to the upper portion of the frame members and is suitably connected to a suitable air supply means and control means, similar to those shown in FIG. 1, for periodically forcing the fluid growing solution up into the growing trays 100 and 101 and for permitting the slow drainage of the growing solution back from the growing trays. A drainage valve 90' is also provided in the tubular support frame 112 for at times permitting the removal of the growing solution therefrom. It is also preferred that the adjacent end walls of the growing trays 100, 101 be interconnected adjacent their bottom walls by a fluid equalizer line 103, shown in phantom lines, so that the fluid level in both trays 100 and 101 remains substantially level while being filled with the growing solution. The fluid equalizer line 103 also ensures that both trays 100, 101 will be drained of the solution at substantially the same levels.

In order to ensure proper distribution of oxygen to all growing trays, it may be desirable to interconnect the drains 76' of each tray with an air diverter tube 93 (FIG. 6). This air diverter tube 93 will extend down into the drains of the endmost trays and extend through the equalizer lines 103 connecting adjacent trays. If additional trays are positioned between the endmost trays, a smaller diameter branch tube, not shown, will be provided in the portions of the air diverter tube 93 extending through the intermediate trays to provide oxygen equally to the solution in all trays. While only two growing trays 100, 101 are shown in FIG. 6, it is to be understood that a greater number of growing trays could be supported on the tubular support frame 112 and arranged in any suitable manner. The tubular support frame 112 can be formed of any diameter of plastic pipe to store the proper amount of solution for the growing trays supported by the frame.

If desired, a suitable heating element can be mounted in a suitable location in the growing solution storage chamber to maintain the growing solution at the proper temperature. While the support frame is described as being formed of pipe sections and connector joints, it is to be understood that the support frame could be formed of single or multiple piece molded or extruded construction.

The hydroponic plant growing device of the present invention thus provides a compact and attractive device for use in a limited space, such as a home, apartment, condominium or the like and the tubular support frame provides a storage chamber for containing the proper volume of fluid growing solution to be periodically supplied to and drained from the plant growing trays supported on the support frame. Once the proper amount of fluid growing solution has been applied to the growing trays, the pressurized air supply means and the control means may be set and requires very little attention by the owner of the hydroponic plant growing device.

In the drawings and specification there has been set forth the best mode presently contemplated for the practice of the present invention, and although specific terms are employed, they are used in a generic and descriptive sense only and not for purposes of limitation, the scope of the invention being defined in the claims.

That which is claimed is:

1. A hydroponic plant growing device comprising
a rectangular plant growing tray including side and end walls, a bottom wall, and an open top, said plant growing tray being adapted to contain an inert aggregate providing a plant growing bed in which the root system of the plants is embedded,
a tubular support frame positioned beneath said plant growing tray and providing a support for retaining said plant growing tray in a horizontal position thereon, said tubular support frame including spaced-apart upper tubular horizontal frame members on which said bottom wall of said plant growing tray is supported, spaced-apart lower tubular horizontal frame members, and vertical tubular frame members having upper and lower ends communicatively connected to the corresponding upper and lower tubular horizontal frame members, said tubular frame members collectively defining a closed storage chamber containing a fluid growing solution, said storage chamber containing a sufficient volume of growing solution to fill but not overflow said plant growing tray,
fluid growing solution drain and supply tube means communicatively connected between said bottom wall of said plant growing tray and said tubular frame members defining said storage chamber,
pressurized air supply means communicatively connected with said fluid growing solution storage chamber, and
control means operatively associated with said pressurized air supply means and being operable to activate said pressurized air supply means and force the fluid growing solution from said fluid growing solution storage chamber and upwardly through said drain and supply tube means into said plant growing tray, said control means also being operable to deactivate said pressurized air supply means and permit the fluid growing solution to drain from said growing tray and back through said fluid growing solution drain and supply tube means and into said tubular frame members defining said fluid growing solution storage chamber.

2. A hydroponic plant growing device according to claim 1 wherein said tubular upper, lower and vertical frame members of said tubular support frame each comprises sections of plastic pipe, and wherein the ends of said plastic pipe sections are communicatively joined together by plastic pipe connector joints.

3. A hydroponic plant growing device according to claim 1 wherein the length and width dimensions of said tubular support frame are substantially the same as the corresponding length and width dimensions of said rectangular plant growing tray.

4. A hydroponic plant growing device according to claim 1 including an air supply line communicatively connecting said pressurized air supply means and said tubular support frame, and wherein said control means includes adjustable air bleeder valve means interposed in said air supply line, said adjustable air bleeder valve means being operable to vary the rate of movement of the fluid growing solution into and out of said plant growing tray.

5. A hydroponic plant growing device according to claim 1 wherein said control means includes timer means for activating and deactivating said pressurized air supply means at variable timed intervals.

6. A hydroponic plant growing device according to claim 1 including multiple rectangular plant growing trays arranged in adjacent side-by-side relationship, and fluid growing solution leveler tube means communicatively connecting adjacent plant growing trays so that the fluid growing solution is evenly supplied to and drained from said plant growing trays, and wherein said tubular support frame extends beneath each of said rectangular plant growing trays and supports the same thereon.

7. A hydroponic plant growing device according to claim 1 wherein said tubular support frame includes substantially inverted U-shaped tubular members positioned adjacent opposite side walls of said plant growing tray and being communicatively connected at opposite ends to said tubular members defining said fluid growing solution storage chamber, said inverted U-shaped tubular members extending above the level of the fluid growing solution and defining an air pressure chamber above the upper level of the fluid growing solution, said air pressure chamber prevents the growing solution from entering said air supply means, and wherein said pressurized air supply means is communicatively connected to said air pressure chamber.

8. A hydroponic plant growing device according to claim 1 wherein said fluid growing solution drain and supply tube means is communicatively connected between said bottom wall of said growing tray and said lower tubular horizontal frame members.

9. A hydroponic plant growing device according to claim 1 including drain means in at least one of said lower tubular horizontal frame members for at times draining the fluid growing solution from said storage chamber.

* * * * *